United States Patent
Sohn et al.

(10) Patent No.: US 9,094,995 B2
(45) Date of Patent: Jul. 28, 2015

(54) METHOD FOR REPORTING CHANNEL STATE INFORMATION IN WIRELESS COMMUNICATION SYSTEM AND APPARATUS THEREFOR

(75) Inventors: Illsoo Sohn, Anyang-si (KR); Jonghyun Park, Anyang-si (KR); Kijun Kim, Anyang-si (KR); Hanbyul Seo, Anyang-si (KR)

(73) Assignee: LG Electronics Inc., Seoul (KR)

( * ) Notice: Subject to any disclaimer, the term of this patent is extended or adjusted under 35 U.S.C. 154(b) by 68 days.

(21) Appl. No.: 13/992,965

(22) PCT Filed: Nov. 16, 2011

(86) PCT No.: PCT/KR2011/008757
§ 371 (c)(1),
(2), (4) Date: Jun. 10, 2013

(87) PCT Pub. No.: WO2012/086926
PCT Pub. Date: Jun. 28, 2012

(65) Prior Publication Data
US 2013/0260779 A1    Oct. 3, 2013

Related U.S. Application Data

(60) Provisional application No. 61/425,203, filed on Dec. 20, 2010.

(51) Int. Cl.
H04W 72/12    (2009.01)
H04L 1/00    (2006.01)
H04L 5/00    (2006.01)
(Continued)

(52) U.S. Cl.
CPC ......... *H04W 72/1247* (2013.01); *H04L 1/0026* (2013.01); *H04L 5/0023* (2013.01);
(Continued)

(58) Field of Classification Search
CPC .................................................. H04W 72/1247
USPC ............ 455/452.1, 434, 435.3; 370/328, 329, 370/395.42
See application file for complete search history.

(56) References Cited

U.S. PATENT DOCUMENTS 8,774,224 B2 *    7/2014    Lee et al. ........................ 370/480
8,798,188 B2 *    8/2014    Kwon et al. .................. 375/285
(Continued)

FOREIGN PATENT DOCUMENTS

EP    2 164 201 A2    3/2010

OTHER PUBLICATIONS

R1-106557, "Introduction of Rel-10 LTE-Advanced features in 36.213", 3GPP TSG-RAN Meeting # 63, Nov. 19, 2010.

*Primary Examiner* — Cong Tran
(74) *Attorney, Agent, or Firm* — McKenna Long & Aldridge LLP

(57) ABSTRACT

The present application relates to a method for enabling a terminal to transmit channel status information in a wireless communication system. Specifically, the method for enabling the terminal to transmit the channel status information in the wireless communication system includes the steps of: receiving a reference signal from a serving cell or an adjacent cell; determining the priority of the predetermined precoding matrix index (PMI) based on the reference signal; and transmitting the PMI together with a stacking flag to the serving cell according to the priority, wherein the number of PMI to be transmitted to the serving cell is determined based on a size of a buffer commonly set in the serving cell and the terminal, and the stacking flag indicates storing the PMI into the buffer or initializing the buffer.

12 Claims, 11 Drawing Sheets

(51) Int. Cl.
    *H04L 25/03*     (2006.01)
    *H04L 1/06*     (2006.01)
    *H04W 24/10*     (2009.01)
    *H04B 7/02*     (2006.01)
    *H04B 7/06*     (2006.01)
    *H04L 1/18*     (2006.01)

(52) U.S. Cl.
    CPC ........ *H04L5/0051* (2013.01); *H04L 25/03955* (2013.01); *H04B 7/024* (2013.01); *H04B 7/0639* (2013.01); *H04L 1/06* (2013.01); *H04L 1/1812* (2013.01); *H04W 24/10* (2013.01)

(56) References Cited

U.S. PATENT DOCUMENTS

2010/0002643  A1    1/2010  Han et al.
2012/0087332  A1*   4/2012  Kim et al. .................... 370/329

* cited by examiner

FIG. 2
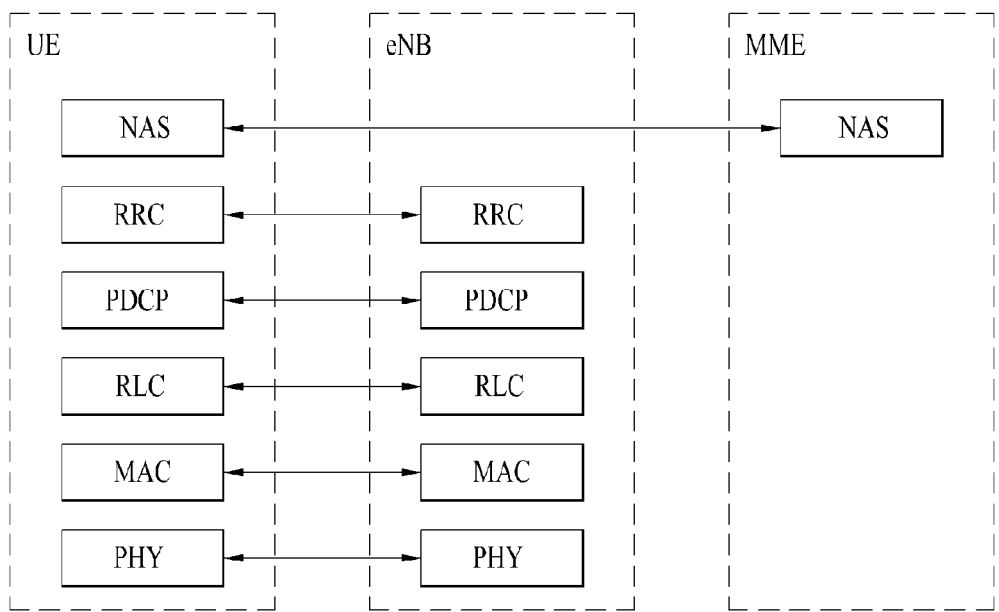
(a) control-plane protocol stack
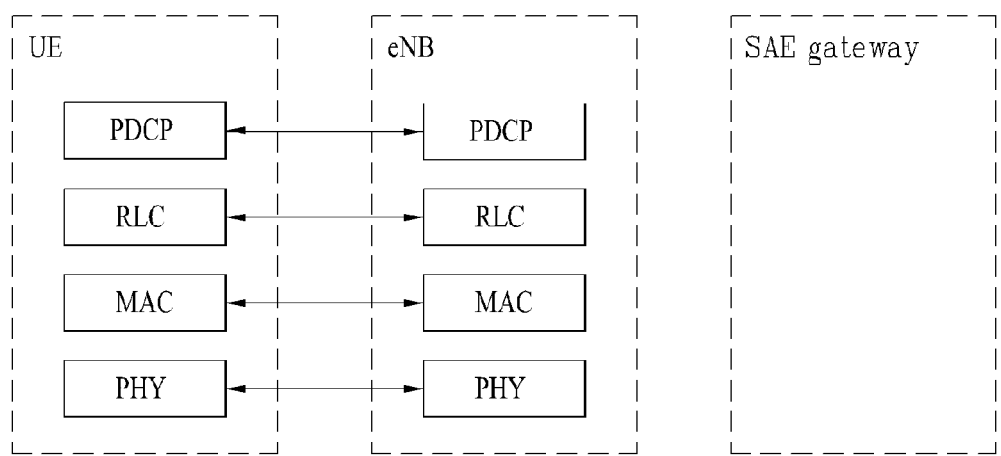
(b) user-plane protocol stack Alt-1

METHOD FOR REPORTING CHANNEL STATE INFORMATION IN WIRELESS COMMUNICATION SYSTEM AND APPARATUS THEREFOR

This Application is a 35 U.S.C. §371 National Stage Entry of International Application No. PCT/KR2011/008757, filed Nov. 16, 2011 and claims the benefit of U.S. Provisional Application No. 61/425,203, filed Dec. 20, 2010, all of which are incorporated by reference in their entirety herein.

TECHNICAL FIELD

The present invention relates to a wireless communication system, and more particularly, to a method for reporting channel status information in a wireless communication system, and an apparatus therefor.

BACKGROUND ART

A $3^{rd}$ generation partnership project long term evolution (3GPP LTE) (hereinafter, referred to as 'LTE') communication system which is an example of a wireless communication system to which the present invention can be applied will be described in brief.

FIG. 1 is a diagram illustrating a network structure of an Evolved Universal Mobile Telecommunications System (E-UMTS) which is an example of a mobile communication system. The E-UMTS is an evolved version of the conventional UMTS, and its basic standardization is in progress under the 3rd Generation Partnership Project (3GPP). The E-UMTS may also be referred to as a Long Term Evolution (LTE) system. For details of the technical specifications of the UMTS and E-UMTS, refer to Release 7 and Release 8 of "3rd Generation Partnership Project; Technical Specification Group Radio Access Network".

Referring to FIG. 1, the E-UMTS includes a User Equipment (UE), a base station (eNode B; eNB), and an Access Gateway (AG) which is located at an end of a network (E-UTRAN) and connected to an external network. Generally, the base station may simultaneously transmit multiple data streams for a broadcast service, a multicast service and/or a unicast service.

One or more cells may exist for one base station. One cell is set to one of bandwidths of 1.25, 2.5, 5, 10, and 20 MHz to provide a downlink or uplink transport service to several user equipments. Different cells may be set to provide different bandwidths. Also, the base station controls data transmission and reception for a plurality of user equipments. The base station transmits downlink (DL) scheduling information of downlink data to the corresponding user equipment to notify the corresponding user equipment of time and frequency domains to which data will be transmitted and information related to encoding, data size, and hybrid automatic repeat and request (HARQ). Also, the base station transmits uplink (UL) scheduling information of uplink data to the corresponding user equipment to notify the corresponding user equipment of time and frequency domains that can be used by the corresponding user equipment, and information related to encoding, data size, and HARQ. An interface for transmitting user traffic or control traffic can be used between the base stations. An interface for transmitting user traffic or control traffic may be used between the base stations. A Core Network (CN) may include the AG and a network node or the like for user registration of the user equipment UE. The AG manages mobility of the user equipment UE on a Tracking Area (TA) basis, wherein one TA includes a plurality of cells.

Although the wireless communication technology developed based on WCDMA has been evolved into LTE, request and expectation of users and providers have continued to increase. Also, since another wireless access technology is being continuously developed, new evolution of the wireless communication technology will be required for competitiveness in the future. In this respect, reduction of cost per bit, increase of available service, use of adaptable frequency band, simple structure, open type interface, proper power consumption of the user equipment, etc. are required.

DISCLOSURE

Technical Problem

Based on aforementioned discussion, an object of the present invention devised to solve the conventional problem is to provide a method for reporting channel status information in a wireless communication system, and an apparatus therefor.

Technical Solution

In one aspect of the present invention, a method for transmitting channel status information at a user equipment in a wireless communication system comprises receiving a reference signal from a serving cell or a neighboring cell; determining a priority of predetermined precoding matrix indexes (PMIs) based on the reference signal; and transmitting the PMIs to the serving cell together with a stacking flag in accordance with the priority, wherein a number of PMIs to be transmitted to the serving cell is determined based on a size of a buffer commonly set in the serving cell and the user equipment, and the stacking flag indicates storing the PMIs into the buffer or initializing the buffer.

Preferably, the PMIs may be transmitted repeatedly to the serving cell in order of a highest priority if the PMIs are stored as much as a size of the buffer and the priority is not changed. Alternatively, only the stacking flag may be transmitted repeatedly if the PMIs are stored as much as a size of the buffer and the priority is not changed.

Preferably, the stacking flag indicates initializing the buffer if the priority is changed.

More preferably, the method may further comprise calculating a channel quality indicator (CQI) for a channel from the serving cell or the neighboring cell based on the PMIs stored in the buffer; and transmitting the channel quality indicator to the serving cell.

Also, the stacking flag has a size of 1 bit, and storing the PMIs into the buffer or initializing the buffer may be indicated by toggle of the stacking flag.

In another aspect of the present invention, a user equipment in a wireless communication system comprises a reception module configured to receive a reference signal from a serving cell or a neighboring cell; a processor configured to determine a priority of precoding matrix indexes (PMIs) based on the reference signal; and a transmission module configured to transmit the PMIs to the serving cell together with a stacking flag in accordance with the priority, wherein a number of PMIs to be transmitted to the serving cell is determined based on a size of a buffer commonly set in the serving cell and the user equipment, and the stacking flag indicates storing the PMIs into the buffer or initializing the buffer.

Advantageous Effects

According to the embodiments of the present invention, the channel status information may effectively be reported in the wireless communication system.

It will be appreciated by persons skilled in the art that that the effects that could be achieved with the present invention are not limited to what has been particularly described hereinabove and other advantages of the present invention will be more clearly understood from the following detailed description.

BRIEF DESCRIPTION OF THE DRAWINGS

FIG. 2 is a diagram illustrating structures of a control plane and a user plane of a radio interface protocol between a user equipment and an E-UTRAN based on the 3GPP radio access network standard;

BEST MODE FOR CARRYING OUT THE INVENTION

Figure 1:
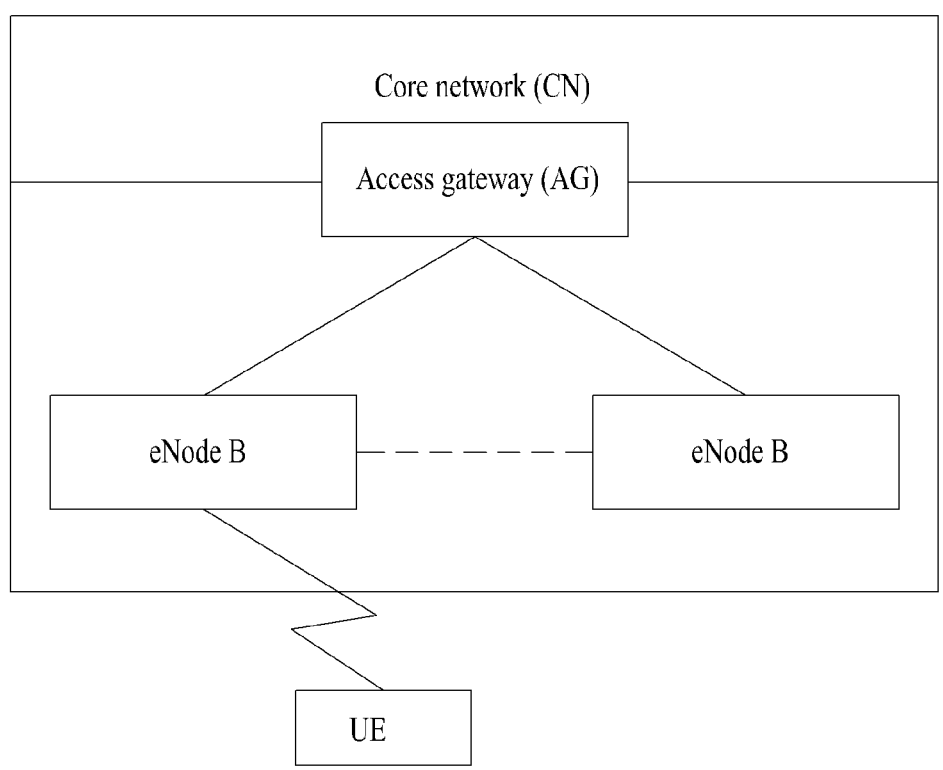
FIG. 1 is a diagram illustrating a network structure of an Evolved Universal Mobile Telecommunications System (E-UMTS), which is an example of a wireless communication system.

Hereinafter, structures, operations, and other features of the present invention will be understood readily by the preferred embodiments of the present invention, examples of which are illustrated in the accompanying drawings. Embodiments described later are examples in which technical features of the present invention are applied to 3GPP system.

Although the embodiment of the present invention will be described based on the LTE system and the LTE-A system in this specification, the LTE system and the LTE-A system are only exemplary, and the embodiment of the present invention may be applied to all communication systems corresponding to the aforementioned definition. Also, although the embodiment of the present invention will be described based on an FDD mode in this specification, the FDD mode is only exemplary, and the embodiment of the present invention may easily be applied to an H-FDD mode or a TDD mode.

FIG. 2 is a diagram illustrating structures of a control plane and a user plane of a radio interface protocol between a user equipment and E-UTRAN based on the 3GPP radio access network standard. The control plane means a passageway where control messages are transmitted, wherein the control messages are used by the user equipment and the network to manage call. The user plane means a passageway where data generated in an application layer, for example, voice data or Internet packet data are transmitted.

A physical layer as the first layer provides an information transfer service to an upper layer using a physical channel. The physical layer (PHY) is connected to a medium access control (MAC) layer via a transport channel, wherein the medium access control layer is located above the physical layer. Data are transferred between the medium access control layer and the physical layer via the transport channel. Data are transferred between one physical layer of a transmitting side and the other physical layer of a receiving side via the physical channel. The physical channel uses time and frequency as radio resources. In more detail, the physical channel is modulated in accordance with an orthogonal frequency division multiple access (OFDMA) scheme in a downlink, and is modulated in accordance with a single carrier frequency division multiple access (SC-FDMA) scheme in an uplink.

A medium access control (MAC) layer of the second layer provides a service to a radio link control (RLC) layer above the MAC layer via a logical channel. The RLC layer of the second layer supports reliable data transmission. The RLC layer may be implemented as a functional block inside the MAC layer. In order to effectively transmit data using IP packets such as IPv4 or IPv6 within a radio interface having a narrow bandwidth, a packet data convergence protocol (PDCP) layer of the second layer performs header compression to reduce the size of unnecessary control information.

A radio resource control (RRC) layer located on the lowest part of the third layer is defined in the control plane only. The RRC layer is associated with configuration, re-configuration and release of radio bearers ('RBs') to be in charge of controlling the logical, transport and physical channels. In this case, the RB means a service provided by the second layer for the data transfer between the user equipment and the network. To this end, the RRC layers of the user equipment and the network exchange RRC message with each other. If the RRC layer of the user equipment is RRC connected with the RRC layer of the network, the user equipment is in an RRC connected mode. If not so, the user equipment is in an RRC idle mode. A non-access stratum (NAS) layer located above the RRC layer performs functions such as session management and mobility management.

One cell constituting a base station eNB is set to one of bandwidths of 1.25, 2.5, 5, 10, 15, and 20 Mhz and provides a downlink or uplink transmission service to several user equipments. At this time, different cells may be set to provide different bandwidths.

As downlink transport channels carrying data from the network to the user equipment, there are provided a broadcast channel (BCH) carrying system information, a paging channel (PCH) carrying paging message, and a downlink shared channel (SCH) carrying user traffic or control messages. Traffic or control messages of a downlink multicast or broadcast service may be transmitted via the downlink SCH or an additional downlink multicast channel (MCH). Meanwhile, as uplink transport channels carrying data from the user equipment to the network, there are provided a random access channel (RACH) carrying an initial control message and an uplink shared channel (UL-SCH) carrying user traffic or control message. As logical channels located above the transport channels and mapped with the transport channels, there are provided a broadcast control channel (BCCH), a paging control channel (PCCH), a common control channel (CCCH), a multicast control channel (MCCH), and a multicast traffic channel (MTCH).

Figure 3:
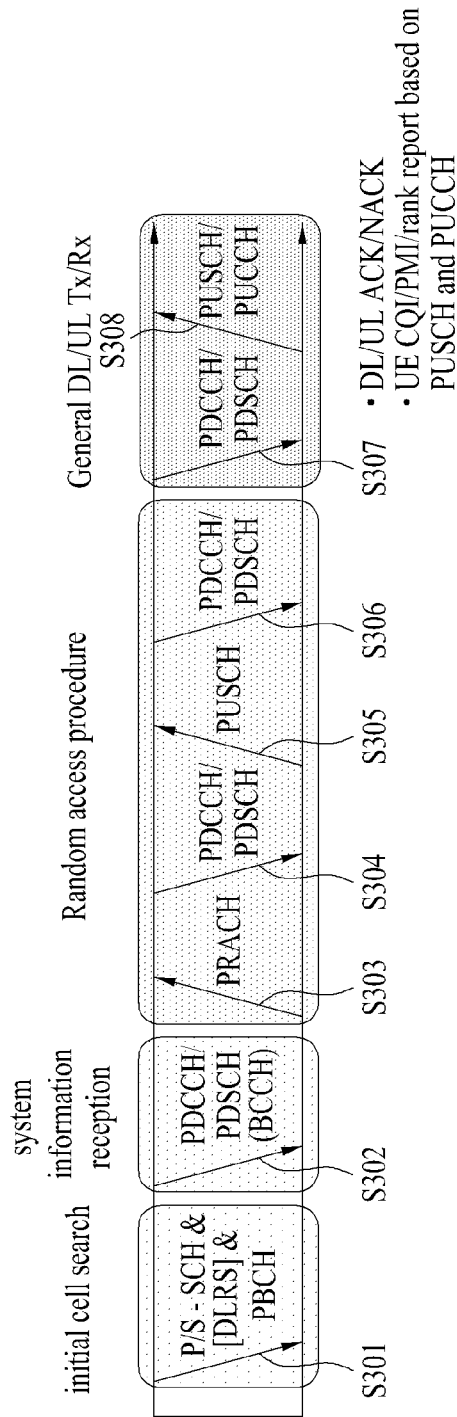
FIG. 3 is a diagram illustrating physical channels used in a 3GPP system and a general method for transmitting a signal using the physical channels.

FIG. 3 is a diagram illustrating physical channels used in a 3GPP system and a general method for transmitting a signal using the physical channels.

The user equipment performs initial cell search such as synchronizing with the base station when it newly enters a cell or the power is turned on (S301). To this end, the user equipment may synchronize with the base station by receiving a primary synchronization channel (P-SCH) and a secondary synchronization channel (S-SCH) from the base station, and may acquire information of cell ID, etc. Afterwards, the user equipment may acquire broadcast information within the cell by receiving a physical broadcast channel (PBCH) from the base station. In the mean time, the user equipment may identify the status of a downlink channel by receiving a downlink reference signal (DL RS) at the initial cell search step.

The user equipment which has finished the initial cell search may acquire more detailed system information by receiving a physical downlink shared channel (PDSCH) in accordance with a physical downlink control channel (PDCCH) and information carried in the PDCCH (S302).

In the meantime, if the user equipment initially accesses the base station, or if there is no radio resource for signal transmission, the user equipment may perform a random access procedure (RACH) for the base station (S303 to S306). To this end, the user equipment may transmit a preamble of a specific sequence through a physical random access channel (PRACH) (303 and S305), and may receive a response message to the preamble through the PDCCH and the PDSCH corresponding to the PDCCH (S304 and S306). In case of a contention based RACH, a contention resolution procedure may be performed additionally.

The user equipment which has performed the aforementioned steps may receive the PDCCH/PDSCH (S307) and transmit a physical uplink shared channel (PUSCH) and a physical uplink control channel (PUCCH) (S308), as a general procedure of transmitting uplink/downlink signals. In particular, the user equipment receives downlink control information (DCI) through the PDCCH. In this case, the DCI includes control information such as resource allocation information on the user equipment, and has different formats depending on its usage.

In the meantime, the control information transmitted from the user equipment to the base station or received from the base station to the user equipment through the uplink includes downlink/uplink ACK/NACK signals, a channel quality indicator (CQI), a precoding matrix index (PMI), a scheduling request (SR), and a rank indicator (RI). In case of the 3GPP LTE system, the user equipment may transmit the aforementioned control information such as CQI/PMI/RI through the PUSCH and/or the PUCCH.

Figure 4:
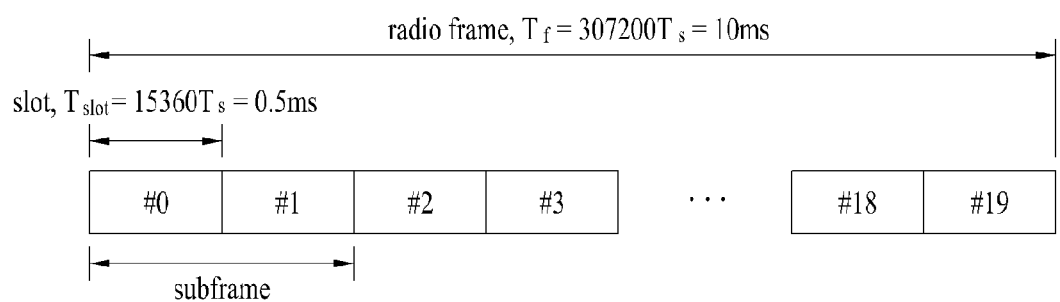
FIG. 4 is a diagram illustrating a structure of a radio frame used in an LTE system.

FIG. 4 is a diagram illustrating a structure of a radio frame used in an LTE system.

Referring to FIG. 4, a radio frame has a length of 10 ms ($327200 \times T_s$) and includes ten (10) subframes of an equal size. Each sub frame has a length of 1 ms and includes two slots. Each slot has a length of 0.5 ms ($15360 T_s$). In this case, $T_s$ represents a sampling time, and is expressed by $T_s=1/(15 kHz \times 2048)=3.2552 \times 10^{-8}$ (about 33 ns). The slot includes a plurality of orthogonal frequency division multiplexing (OFDM) symbols or single carrier-frequency division multiple access (SC-FDMA) symbols in a time domain, and includes a plurality of resource blocks (RBs) in a frequency domain. In the LTE system, one resource block includes twelve (12) subcarriers×seven (or six) OFDM symbols or SC-FDMA symbols. A transmission time interval (TTI), which is a transmission unit time of data, may be determined in a unit of one or more subframes. The aforementioned structure of the radio frame is only exemplary, and various modifications may be made in the number of subframes included in the radio frame or the number of slots included in the subframe, or the number of OFDM symbols or SC-FDMA symbols included in the slot.

Figure 5:
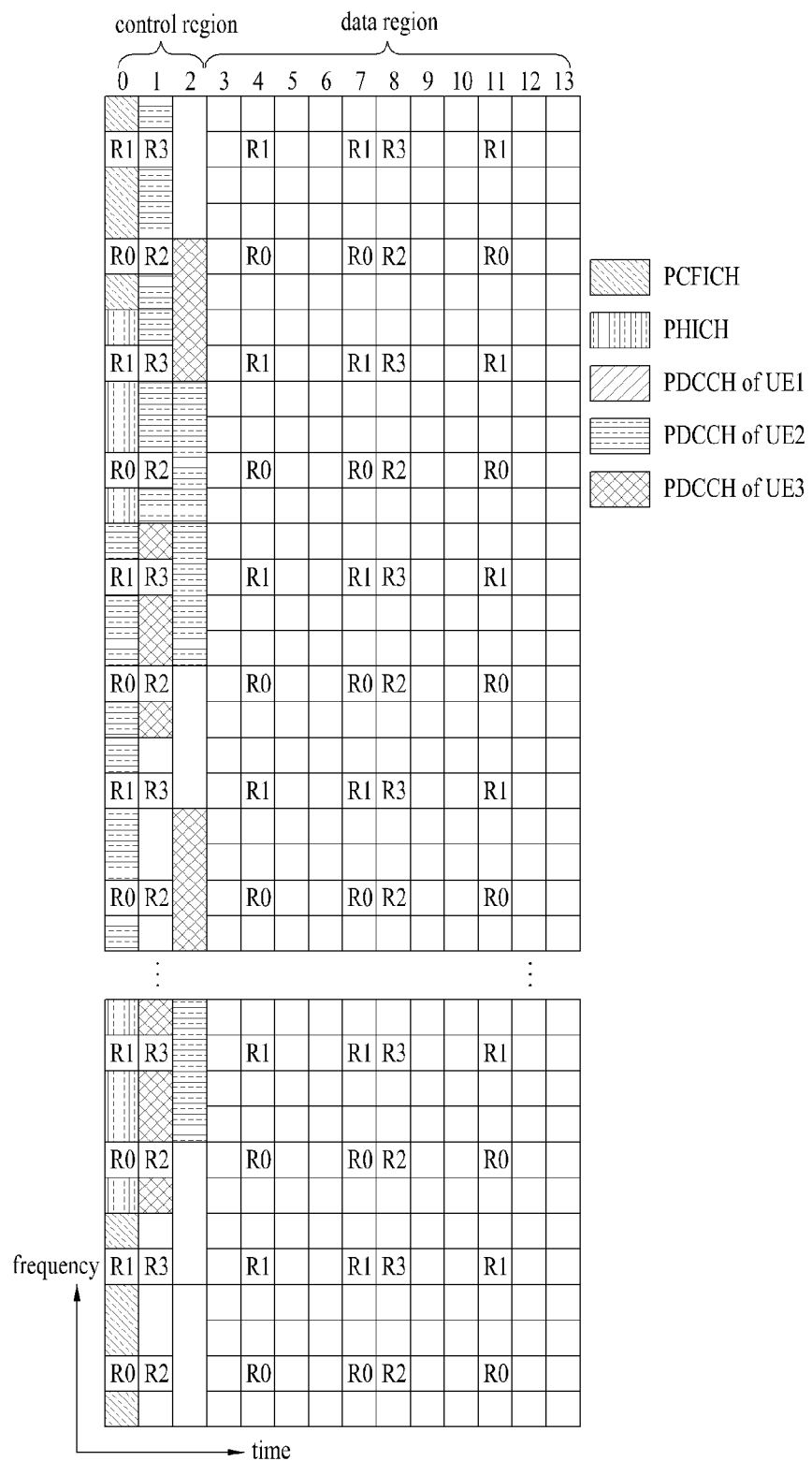
FIG. 5 is a diagram illustrating a structure of a downlink radio frame used in an LTE system.

FIG. 5 is a diagram illustrating a control channel included in a control region of one subframe in a downlink radio frame.

Referring to FIG. 5, the subframe includes fourteen (14) OFDM symbols. First one to three OFDM symbols are used as the control region in accordance with subframe configuration, and the other thirteen to eleven OFDM symbols are used as the data region. In FIG. 5, R0 to R3 represent reference signals (RS) (or pilot signals) of antennas 0 to 3. The RS is fixed by a given pattern within the subframe regardless of the control region and the data region. The control channel is allocated to a resource to which the RS is not allocated in the control region, and a traffic channel is also allocated to a resource to which the RS is not allocated in the data region. Examples of the control channel allocated to the control region include a Physical Control Format Indicator Channel (PCFICH), a Physical Hybrid-ARQ Indicator Channel (PHICH), and a Physical Downlink Control Channel (PDCCH).

The PCFICH notifies the user equipment of the number of OFDM symbols used in the PDCCH per subframe. The PCFICH is located in the first OFDM symbol and configured prior to the PHICH and the PDCCH. The PCFICH includes four resource element groups (REG), each REG being distributed in the control region based on cell identity (cell ID). One REG includes four resource elements (REs). The RE represents a minimum physical resource defined by one subcarrier×one OFDM symbol. The PCFICH value indicates a value of 1 to 3 or a value of 2 to 4 depending on a bandwidth, and is modulated by Quadrature Phase Shift Keying (QPSK).

The PHICH is a physical hybrid-automatic repeat and request (HARQ) indicator channel and is used to carry HARQ ACK/NACK signals for uplink transmission. Namely, the PHICH represents a channel where DL ACK/NACK information for UL HARQ is transmitted. The PHICH includes one REG, and is cell-specifically scrambled. The ACK/NACK signals are indicated by 1 bit, and are modulated by binary phase shift keying (BPSK). The modulated ACK/NACK are spread by a spreading factor (SF)=2 or 4. A plurality of PHICHs may be mapped with the same resource and constitute a PHICH group. The number of PHICHs multiplexed in the PHICH group is determined by the number of spreading codes. The PHICH (group) is repeated three times to obtain diversity gain in the frequency domain and/or the time domain.

The PDCCH is allocated to first n number of OFDM symbols of the subframe, wherein n is an integer greater than 1 and is indicated by the PCIFCH. The PDCCH includes one or more CCEs. The PDCCH notifies each user equipment or user equipment group of information related to resource allocation of transport channels, i.e., a paging channel (PCH) and a downlink-shared channel (DL-SCH), uplink scheduling grant, HARQ information, etc. The paging channel (PCH) and the downlink-shared channel (DL-SCH) are transmitted through the PDSCH. Accordingly, the base station and the user equipment respectively transmit and receive data through the PDSCH except for specific control information or specific service data.

Information as to user equipment(s) (one user equipment or a plurality of user equipments) to which data of the PDSCH are transmitted, and information as to how the user equipment(s) receives and decodes PDSCH data are transmitted by being included in the PDCCH. For example, it is assumed that a specific PDCCH is CRC masked with radio network temporary identity (RNTI) called "A," and information of data transmitted using a radio resource (for example, frequency location) called "B" and transmission format information (for example, transport block size, modulation mode, coding information, etc.) called "C" is transmitted through a specific subframe. In this case, one or more user equipments located in a corresponding cell monitor the PDCCH by using their RNTI information, and if there are one or more user equipments having RNTI called "A", the user equipments receive the PDCCH, and receive the PDSCH indicated by "B" and "C" through information of the received PDCCH.

Figure 6:
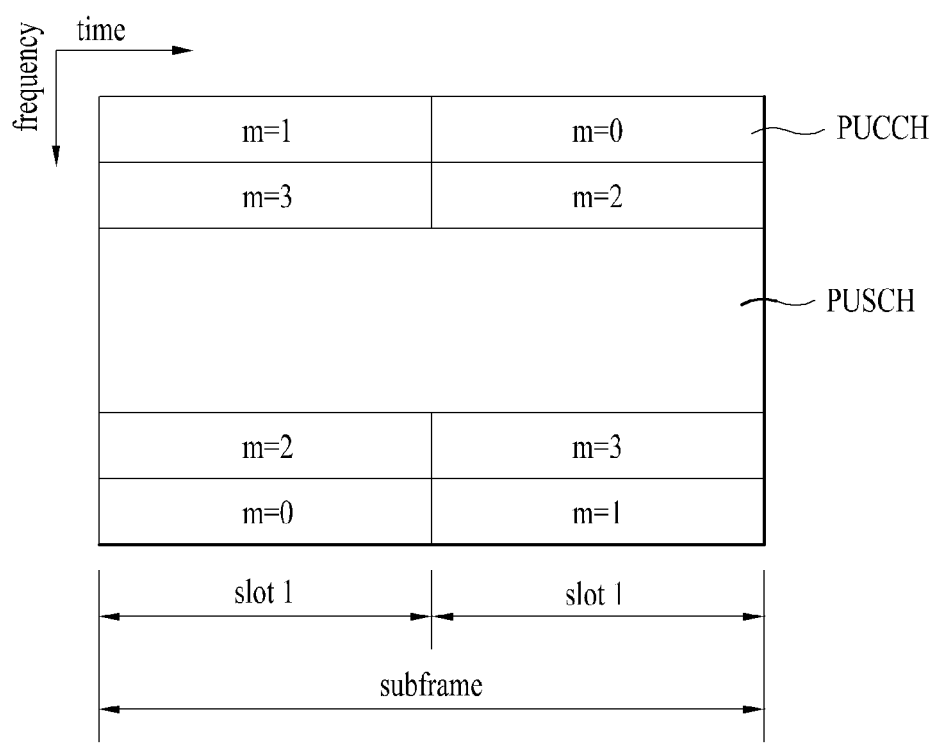
FIG. 6 is a diagram illustrating a structure of an uplink radio frame used in an LTE system.

FIG. 6 is a diagram illustrating a structure of an uplink subframe used in an LTE system.

Referring to FIG. 6, the uplink subframe may be divided into a region to which a physical uplink control channel (PUCCH) carrying control information is allocated, and a region to which a physical uplink shared channel (PUSCH) carrying user data is allocated. The center part of the subframe is allocated to the PUSCH, and both parts of the data region in the frequency domain are allocated to the PUCCH. Examples of the control information transmitted on the PUCCH include ACK/NACK used for HARQ, a channel quality indicator (CQI) indicating the status of a downlink channel, a rank indicator (RI) for MIMO, and a scheduling request (SR) corresponding to uplink resource allocation request. The PUCCH for one user equipment uses one resource block that occupies different frequencies in each slot within the subframe. Namely, two resource blocks allocated to the PUCCH undergo frequency hopping in the boundary of the slots. Particularly, FIG. 6 exemplarily illustrates that PUCCH of m=0, PUCCH of m=1, PUCCH of m=2, and PUCCH of m=3 are allocated to the subframe.

Hereinafter, a Multiple-Input Multiple-Output (MIMO) system will be described. MIMO means a scheme that a plurality of transmitting antennas and a plurality of receiving antennas are used. Data transmission and reception efficiency may be improved by the MIMO scheme. Namely, a transmitter or receiver of a wireless communication system may enhance capacity and improve throughput by using a plurality of antennas. Hereinafter, MIMO may be referred to as 'MIMO antenna'.

The MIMO antenna technology does not depend on a signal antenna path to receive a whole message. Instead, in the MIMO antenna technology, data fragments received from a plurality of antennas are incorporated to complete data. If the MIMO antenna technology is used, a data transmission rate may be improved within a specific sized cell region, or system coverage may be enhanced with a specific data transmission rate. Also, the MIMO antenna technology may widely be used for a user equipment for mobile communication and a relay station. According to the MIMO antenna technology, it is possible to overcome limitation of a transmission rate in mobile communication according to the related art where a single antenna is used.

Figure 7:
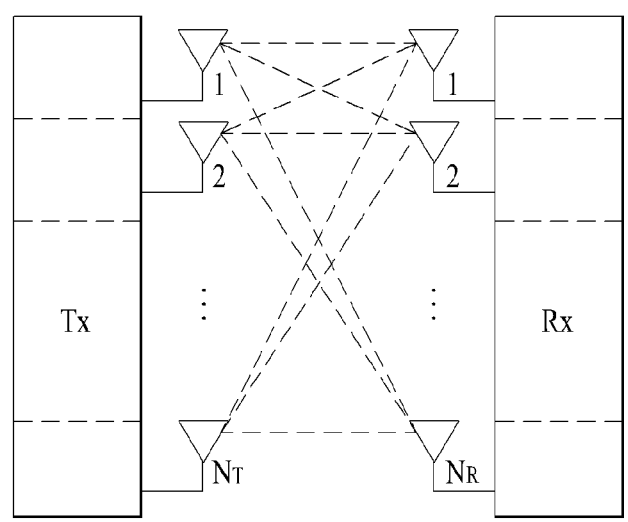
FIG. 7 is a schematic diagram illustrating a general MIMO communication system.

A schematic diagram of a general MIMO communication system described in the present invention is illustrated in FIG. 7. Referring to FIG. 7, $N_T$ number of transmitting antennas are provided at a transmitter while $N_R$ number of receiving antennas are provided at a receiver. If a plurality of antennas are used at both the transmitter and the receiver, theoretical channel transmission capacity is more increased than that a plurality of antennas are used at any one of the transmitter and the receiver. Increase of the channel transmission capacity is proportional to the number of antennas. Accordingly, the transmission rate is improved, and frequency efficiency is also improved. Supposing that a maximum transmission rate is $R_O$ when a single antenna is used, a transmission rate corresponding to a case where multiple antennas are used may be increased theoretically as expressed by the following Equation 1 as much as a value obtained by multiplying a maximum transmission rate $R_O$ by a rate increase R. In this case, R, corresponds to a smaller value of $N_T$ and $N_R$.

$$R_i = \min(N_T, N_R) \quad \text{[Equation 1]}$$

For example, in a MIMO communication system that uses four transmitting antennas and four receiving antennas, a transmission rate four times greater than that of a single antenna system may be obtained. After such theoretical capacity increase of the MIMO system has been proved in the middle of 1990, various technologies have been actively studied to substantially improve a data transmission rate. Some of the technologies have been already reflected in the standard of various wireless communications such as third generation mobile communication and next generation wireless LAN.

Upon reviewing the recent trend of studies related to the MIMO system, active studies are ongoing in view of various aspects such as the study of information theoretical aspect related to MIMO communication capacity calculation under various channel environments and multiple access environments, the study of radio channel measurement and model of a MIMO system, and the study of time space signal processing technology for improvement of transmission reliability and transmission rate.

In order to describe a communication method in a MIMO system in more detail, mathematical modeling of the communication method may be expressed as follows. As illustrated in FIG. 7, it is assumed that $N_T$ number of transmitting antennas and $N_R$ number of receiving antennas exist. First of all, a transmitting signal will be described. If there exist $N_T$ number of transmitting antennas, since the number of maximum transmission information is $N_T$, the transmission information may be expressed by a vector shown in Equation 2 as follows.

$$s = [s_1, s_2, \ldots, s_{N_T}]^T \quad \text{[Equation 2]}$$

Meanwhile, different kinds of transmission power may be applied to each of the transmission information $s_1, s_2, \ldots, s_{N_T}$. At this time, supposing that each transmission power is $P_1, P_2, \ldots, P_{N_T}$, transmission information of which transmission power is controlled may be expressed by a vector shown in Equation 3 as follows.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

Also, $\hat{s}$ may be expressed by Equation 14 below using a diagonal matrix P.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Meanwhile, it is considered that a weight matrix W is applied to the information vector $\hat{s}$ of which transmission power is controlled, so as to obtain $N_T$ transmitting signals $x_1, x_2, \ldots x_{N_T}$. In this case, the weight matrix serves to properly distribute the transmission information to each antenna depending on a transmission channel status. Such transmitting signals $x_1, x_2, \ldots, x_{N_T}$ may be expressed by Equation 5 below using a vector X. In this case, $W_{ij}$ means a weight value between the ith transmitting antenna and the jth information. W may be referred to as a weight matrix or precoding matrix.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & \ddots & \vdots \\ w_{N_T1} & w_{N_T2} & \cdots & w_{N_TN_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \qquad \text{[Equation 5]}$$

Generally, a rank in the channel matrix may physically mean the maximum number of rows or columns that may transmit different kinds of information from a given channel. Accordingly, since a rank of the channel matrix is defined by a minimum number of independent rows or columns, it is not greater than the number of rows or columns. For example, a rank H of the channel matrix H is restricted as illustrated in Equation 6 below.

$$\text{rank}(H) \leq \min(N_T, N_R) \qquad \text{[Equation 6]}$$

Also, different kinds of information transmitted using the MIMO technology will be defined as 'transport stream' or more simply as 'stream'. This stream may be referred to as a 'layer'. In this case, the number of transport streams cannot be greater than the rank of the channel, which corresponds to the maximum number that may transmit different kinds of information. Accordingly, the channel matrix H may be expressed by the following Equation 7.

$$\text{\# of streams} \leq \text{rank}(H) \leq \min(N_T, N_R) \qquad \text{[Equation 7]}$$

In this case, "# of streams" represents the number of streams. Meanwhile, it is to be understood that one stream may be transmitted through one or more antennas.

Various methods for corresponding one or more streams to several antennas may exist. These methods may be described, as follows, depending on the types of the MIMO technology. If one stream is transmitted through several antennas, it may be regarded as a spatial diversity scheme. If several streams are transmitted through several antennas, it may be regarded as a spatial multiplexing scheme. Of course, a hybrid scheme of the spatial diversity scheme and the spatial multiplexing scheme may exist.

In the meantime, it is expected that the LTE-A system, which is the standard of the next generation wireless communication system, will support a coordinated multi point (CoMP) system, which has not been supported by the existing standard, so as to improve a data transmission rate. In this case, the CoMP system means that two or more base stations or cells perform communication with a user equipment by coordinating with each other to improve communication throughput between the base station (cell or sector) and the user equipment located in a shaded zone.

Examples of the CoMP system may include a coordinated MIMO type joint processing (CoMP-JP) system through data sharing and a CoMP-coordinated scheduling/beamforming (CoMP-CS) system.

In case of the down link, according to the joint processing (CoMP-JP) system, the user equipment may simultaneously receive data from each base station that performs CoMP transmission system, and may improve receiving throughput by combining the signals received from each base station (joint transmission; JT). Also, there may be considered a method for transmitting data from one of base stations, which perform the CoMP transmission system, to the user equipment at a specific time. Unlike the joint processing system, according to the coordinated scheduling/beamforming (CoMP-CS) system, the user equipment may momentarily receive data from one base station, that is, serving base station, through beamforming.

In case of the uplink according to the joint processing (CoMP-JP) system, each base station may simultaneously receive the PUSCH signal from the user equipment (joint reception; JR). Unlike this joint processing system, according to the coordinated scheduling/beamforming (CoMP-CS) system, only one base station may receive the PUSCH signal. At this time, coordinated cells (or base stations) determine to use the coordinated scheduling/beamforming (CoMP-CS) system.

Hereinafter, reporting of channel status information (CSI) will be described. In the current LTE standard, an open-loop MIMO transmission system operated without channel information and a closed-loop MIMO transmission system operated based on channel information exist. In particular, in the closed-loop MIMO transmission system, each of the base station and the user equipment may perform beamforming based on channel status information to obtain multiplexing gain of MIMO antenna. The base station transmits a reference signal to the user equipment to obtain channel status information from the user equipment, and commands the user equipment to feed back the channel status information, which is measured based on the reference signal, through a physical uplink control channel (PUCCH) or a physical uplink shared channel (PUSCH).

The CSI is classified into a rank indicator (RI), a precoding matrix index (PMI), and a channel quality indicator (CQI). First of all, RI represents rank information of a channel as described above, and means the number of streams that may be received by the user equipment through the same frequency-time resource. Also, since RI is determined by long term fading, it is fed back to the base station at a time period longer than that of the PMI and the CQI.

Second, the PMI is a value obtained by reflecting spatial properties of a channel, and represents a precoding matrix index of the base station, which is preferred by the user equipment, based on metric such as SINR. Finally, the CQI is a value indicating channel strength, and means received SINR that may be obtained when the base station uses the PMI.

In the more advanced communication system such as the LTE-A standard, multi-user diversity has been additionally obtained using multi-user MIMO (MU-MIMO). Since interference between user equipments multiplexed in an antenna domain exists in the MU-MIMO, exactness or non-exactness of the CSI may affect interference of the other multiplexed user equipments as well as the user equipment that has reported the CSI. Accordingly, more exact CSI reporting is required in the MU-MIMO than the SU-MIMO.

Also, in case of CoMP JT, since several base stations transmit same data to a specific user equipment in coordination with one another, CoMP JT may be regarded as MIMO system in which antennas are theoretically distributed geographically. In other words, even in case of MIMO in JT, channel status information of high exactness is required to avoid interference between user equipments which are scheduled in coordination. Even in case of CoMP CB, exact channel status information is required to avoid interference from a neighboring cell to a serving cell. Generally, in order to increase exactness in feeding back channel status information, additional channel status information feedback report of the user equipment is required and is transmitted to the base station through the PUCCH or PUSCH.

Based on the aforementioned description, the present invention suggests a channel status information feedback scheme of the user equipment, which increases exactness of channel status information feedback using control information that reflects time correlation properties of channels.

1. Determination of Priority of PMI

The user equipment estimates a channel from eNB of a serving cell or eNB of a neighboring cell by using a reference signal, which is received from the eNB of the serving cell or the eNB of the neighboring cell, for example, CSI-RS. In this case, the user equipment assumes that the eNB uses random PMIs within a codebook, which is previously scheduled, and determines priority of each PMI by calculating an estimated transmission rate or signal strength of each PMI candidate, which may be applied thereto.

Figure 8:
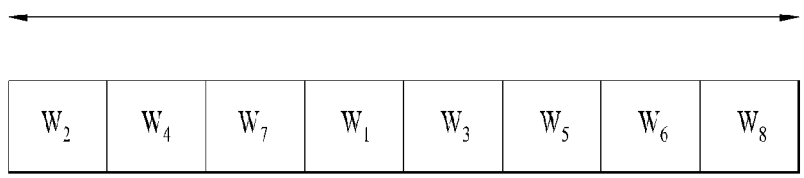
FIG. 8 is a diagram illustrating an example of setting priority over PMI candidates within a codebook, which is previously scheduled, in accordance with the embodiment of the present invention.

FIG. 8 is a diagram illustrating an example of setting priority over PMI candidates within a codebook, which is previously scheduled, in accordance with the embodiment of the present invention. In particular, FIG. 8 illustrates the status that eight PMI candidates exist within a codebook.

Referring to FIG. 8, the priority may be determined in the order of the higher signal strength in the same manner as a first scheme, and may be determined in the order of the smaller sized signals in the same manner as a second scheme.

2. Definition of Stacking Flag

Reporting of channel status information according to the present invention is controlled by a stacking flag transmitted from the user equipment to the eNB together with channel status information. Control of feedback operation of the channel status information by the stacking flag may be defined in various manners. For example, a stacking operation or clearing operation may be defined by a stacking flag of 1 bit size. At this time, a stacking flag '1' may be implemented by the stacking operation, and a stacking flag '0' may be implemented by the clearing operation. Alternatively, the clearing operation may be performed whenever the stacking flag is toggled while the stacking operation is being operated.

3. Basic Operation of Slow Index Stacking (SIS)

The user equipment reports the PMIs as its channel status information in due order in accordance with the PMI priority determined as above. When the user equipment initially performs feedback of the channel status information, it transmits a stacking flag, which means clearing of the PMI of the highest priority, together with the channel status information. Each of the user equipment and the eNB resets its buffer and stores index at that time.

Referring to FIG. 8, if priority is set in accordance with the first scheme based on the signal received from the neighboring cell, the user equipment reports index of $W_2$, which is the PMI estimated to have the greatest interference received from the neighboring cell, and stores the corresponding index in a buffer. When the user equipment feeds the channel status information back after a given period or in accordance with an aperiodic request of the eNB, the user equipment may be operated differently depending on change of the channel status information.

If the channel status information remains unchanged due to UE mobility, etc., the priority of the PMIs, which are calculated from the previous channel status information, is not changed. In this case, the user equipment reports index (for example, $W_4$) of PMI of next order except for PMI reported by previous feedback, together with the stacking flag that means the stacking operation. The eNB and the user equipment store the PMIs reported previously in accordance with previous schedule in addition to newly reported PMI in their buffer as effective channel status information feedback. Also, if the channel status information is not changed, the PMIs are stored in the buffer in the order of $W_2$, $W_4$, $W_7$ and $W_1$ through repetition of the aforementioned step, and the channel status information becomes exact gradually.

However, if the priority of the newly calculated PMI is changed differently from the priority of the PMIs calculated by previous channel status information feedback due to change of the channel status information, the operation of the user equipment may be defined as follows. The user equipment transmits the PMI having the highest priority based on the priority of PMIs, which are newly calculated, together with the stacking flag that means the clearing operation. At this time, the eNB and the user equipment make their buffer empty and store the newly reported PMIs in their buffer.

4. Determination of Maximum Buffer Size

Maximum buffer size used for feedback of the channel status information may be limited in accordance with a value scheduled between the eNB and the user equipment. If the PMIs are filled to reach the maximum size of the buffer, the user equipment UE does not report the PMI of next order any more.

Figure 9:
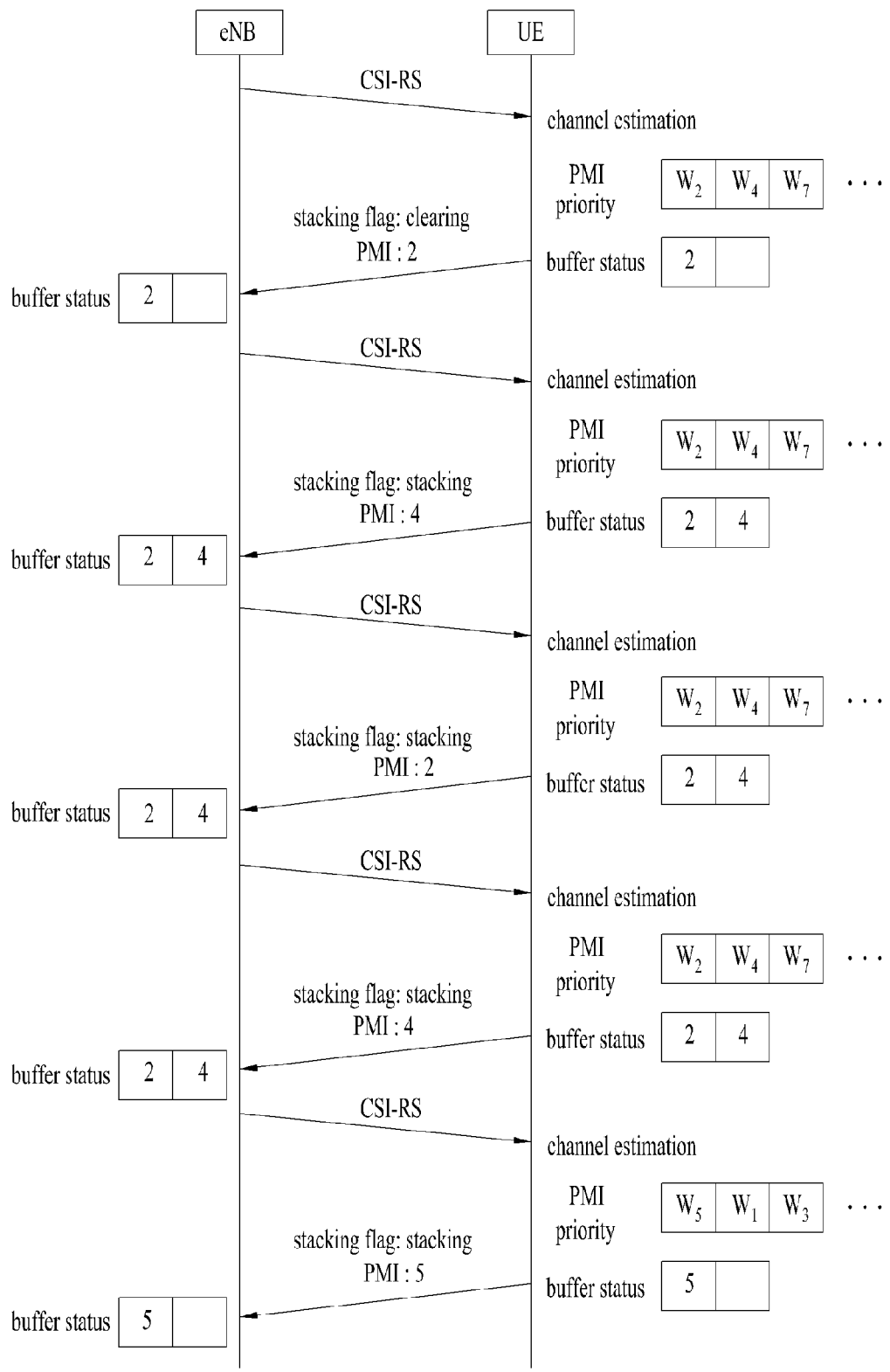
FIG. 9 is a diagram illustrating a method for feeding channel status information back in accordance with the embodiment of the present invention.

FIG. 9 is a diagram illustrating a method for feeding channel status information back in accordance with the embodiment of the present invention. In particular, in FIG. 9 and FIG. 10, it is assumed that maximum buffer size is set to 2.

In FIG. 9, when the PMIs are filled to reach the maximum size of the buffer, if the priority order of the PMIs is not changed, the user equipment returns to the start point instead of $W_7$ which is the PMI of next order together with the stacking flag that means the stacking operation and reports the PMIs in the order of the highest priority. Since this method reports the PMIs repeatedly, it is advantageous in that reliability of channel status information may be enhanced against the case where an error occurs in the middle of channel reporting.

Figure 10:
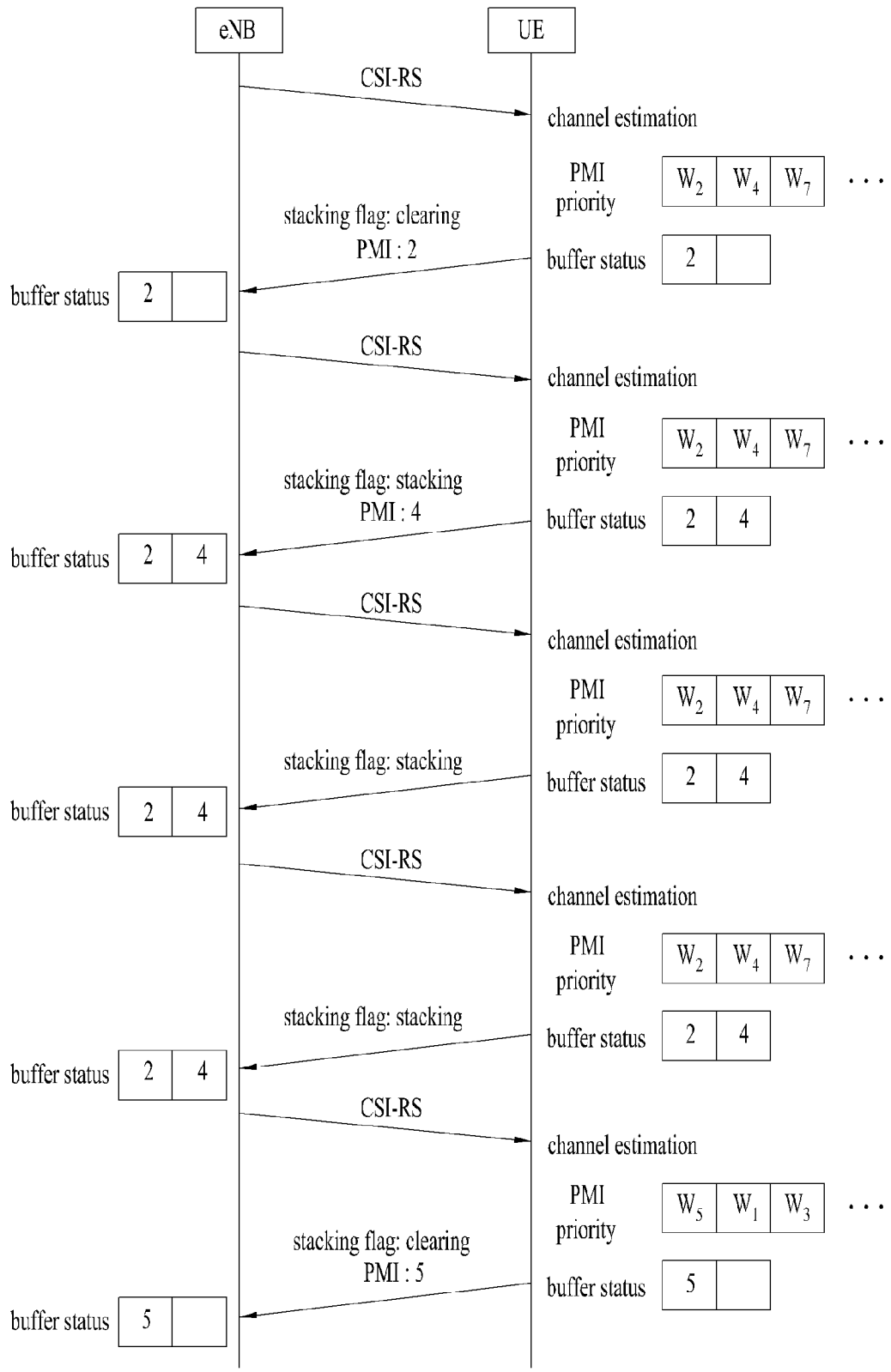
FIG. 10 is another diagram illustrating a method for feeding channel status information back in accordance with the embodiment of the present invention.

In FIG. 10, when the PMIs are filled to reach maximum size of the buffer, if priority order of the PMIs is not changed, the user equipment UE repeatedly transmits the stacking flag that means the stacking operation and does not report the PMIs any more until the channel status information is changed. This method is advantageous in that power consumption of the user equipment may be reduced.

In order to determine the maximum buffer size, various parameters such as size of a codebook used in PMI, UE mobility, and Doppler frequency may be considered. Although the channel status feedback information becomes more exact if the maximum buffer size is set within a great range, the full channel status information feedback amount becomes great and complexity of the eNB and the user equipment is increased unnecessarily. If the maximum buffer size is set within a small range, the channel status feedback information is relatively inexact but the full channel status information feedback amount becomes small and complexity of the eNB and the user equipment is lowered.

Accordingly, information associated with the maximum buffer size may be determined semi-statically and then transmitted to the user equipment through higher layer signaling. Otherwise, the information associated with the maximum buffer size may be determined dynamically and then transmitted to the user equipment through L1/L2 signaling. Otherwise, the user equipment may determine the information associated with the maximum buffer size by itself and transmit the information to the eNB.

5. Condition of Clearing Operation

The clearing operation based on the stacking flag, that is, the condition for determining previously reported PMI stored in the buffer to be empty may be implemented in various manners. For example, if the priority of PMIs stored in the buffer is not coincident with the priority newly calculated from the current channel status information, the clearing operation may be performed.

For another example, as a condition relaxed from the above condition, if indexes in the priority of PMIs stored in the buffer are coincident with those in the priority newly calculated from the current interference channel regardless of the order, the clearing operation may not be performed.

In the meantime, when the channel status information is not changed for a long time, the clearing operation may be performed per given period or in accordance with an aperiodic request to prevent an error occurring in the middle of the feedback of the channel status information from being propagated continuously.

6. CQI Calculation Method

The user equipment may report CQI, which indicates channel quality, together with the PMI when feeding back channel status information. The CQI is calculated as follows in accordance with the method for determining priority of PMIs of the user equipment and the eNB. When feeding back the channel status information, it is assumed that the priority of PMIs is determined in the order of higher signal strength based on the signal received from the serving cell in the same manner as the first scheme and then reported. In this case, the user equipment calculates the CQI on the assumption that one of PMIs currently stored in the buffer is used by the eNB.

At this time, on the assumption that the PMI of a final order finally stored in the buffer is used, the user equipment may calculate a minimum CQI, and may calculate average CQI by averaging signal strength when the PMIs stored in the buffer are used.

In the meantime, when feeding back the channel status information, it is assumed that the priority of the PMIs is determined in the order of lower signal strength based on the signal received from the serving cell in the same manner as the second scheme and then reported. In this case, the user equipment calculates the CQI on the assumption that the PMIs currently stored in the buffer will not be used by the eNB. At this time, on the assumption that the PMI of a final order finally stored in the buffer is used, the user equipment may calculate a minimum CQI, and may calculate average CQI by averaging signal strength when PMIs, which are not stored in the buffer, are used.

7. CQI Feedback

The CQI calculated by the user equipment may be reported to the eNB as an example of the channel status information feedback in the same manner as the PMIs and stacking flag. The CQI may be reduced or increased a little whenever the buffer is updated by the stacking operation. Accordingly, in order to reduce the feedback information amount, the CQI may be reported in the form of offset value ($\Delta$ CQI) for the CQI initially reported after the clearing operation. If the buffer is filled at the maximum range in the same manner as report of the PMIs, since the CQI is not changed, the user equipment does not transmit the CQI any more or may repeatedly transmit the same CQI.

8. Feedback Format of User Equipment

The channel status information feedback of the user equipment, which is suggested in the present invention, may be implemented through signaling of the current LTE standard or LTE-A standard.

For example, in case of periodic channel status information feedback, a stacking flag of 1 bit size is coded together with the PMI and the CQI, whereby the stacking flag may be transmitted using a PUCCH format 2. Alternatively, RI/PMI/CQI may be transmitted in accordance with the existing transmission scheme, and the stacking flag may only be transmitted using a PUCCH format 1.

Also, in case of aperiodic channel status information feedback, RI/PMI/CQI and the stacking flag may be transmitted together through the PUSCH. Alternatively, considering the current status of the buffer and a load level of the uplink, the eNB may request the user equipment to feed back the channel status information, which includes a plurality of kinds of RI/PMI/CQI and stacking flags, through the PUSCH.

9. Application Example

The channel status information feedback scheme of the user equipment, which is suggested in the present invention, may be used to report the channel status information from the eNB of the serving cell or the channel status information that means the interference amount from the eNB of the neighboring cell.

In this case, if the priority order of the PMIs is determined in the order of the higher signal strength in the same manner as the first scheme, the priority information may be used as the PMI order which is not preferred for the PMI of the neighboring cell. Also, in the same manner as the second scheme, if the priority order of the PMIs is determined in the order of the lower signal strength in the same manner as the second scheme, the priority information may be used as the PMI order which is preferred for PMI of the neighboring cell. Also, in the same manner as the channel status information feedback to the eNB of the serving cell, the PMIs are sequentially reported in the form of RI/PMI. When the interference channel status information from the neighboring cell is reported, CQI calculation is as follows.

If the priority order of the PMIs is determined in the order of the higher signal strength in the same manner as the first scheme, the CQI is calculated on the assumption that the PMIs currently stored in the buffer are not used by the neighboring cell. At this time, the minimum CQI may be calculated on the assumption that PMI of a final order, which is finally stored in the buffer, is used, or average CQI may be calculated by averaging interference signal strength when the other PMIs, which are not stored in the buffer, are used.

In the meantime, if the priority order of the PMIs is determined in the order of the lower signal strength in the same manner as the second scheme, the CQI is calculated on the assumption that the PMIs currently stored in the buffer are selected and used by the eNB of the neighboring cell. At this time, minimum CQI may be calculated on the assumption that the PMI of a final order, which is finally stored in the buffer, is used, or average CQI may be calculated by averaging interference signal strength when the PMIs, which are stored in the buffer, are used.

Also, in the same manner as channel reporting to the eNB of the serving cell, in order to reduce the feedback information amount, the CQI may be reported in the form of offset value (Δ CQI) for the CQI initially reported after the clearing operation.

Figure 11:
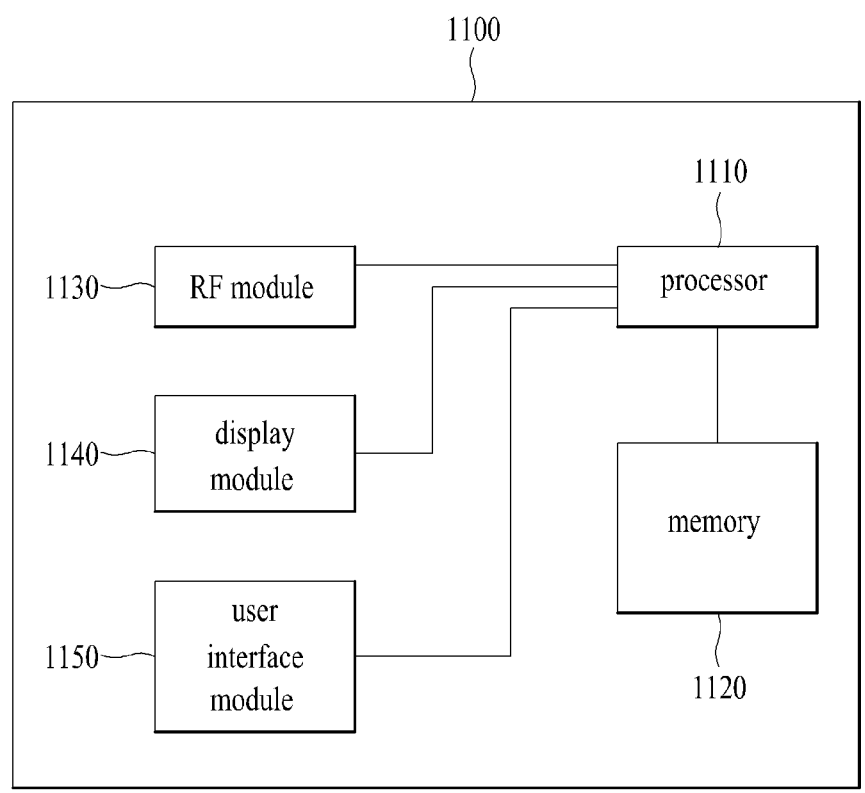
FIG. 11 is a block diagram illustrating a communication apparatus according to the embodiment of the present invention.

FIG. 11 is a block diagram illustrating a communication apparatus according to the embodiment of the present invention.

Referring to FIG. 11, the communication apparatus 1100 includes a processor 1110, a memory 1120, a radio frequency (RF) module 1130, a display module 1140, and a user interface module 1150.

The communication apparatus 1100 is illustrated for convenience of description, and some of its modules may be omitted. Also, the communication apparatus 1100 may further include necessary modules. Moreover, some modules of the communication apparatus 1100 may be divided into segmented modules. The processor 1110 is configured to perform the operation according to the embodiment of the present invention illustrated with reference to the drawings. In more detail, a detailed operation of the processor 1110 will be understood with reference to the disclosure described with reference to FIG. 1 to FIG. 10.

The memory 1120 is connected with the processor 1110 and stores an operating system, an application, a program code, and data therein. The RF module 1130 is connected with the processor 1110 and converts a baseband signal to a radio signal or vice versa. To this end, the RF module 1130 performs analog conversion, amplification, filtering and frequency uplink conversion, or their reverse processes. The display module 1140 is connected with the processor 1110 and displays various kinds of information. Examples of the display module 1140 include, but not limited to, a liquid crystal display (LCD), a light emitting diode (LED), and an organic light emitting diode (OLED). The user interface module 1150 is connected with the processor 1110, and may be configured by combination of well known user interfaces such as keypad and touch screen.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments of the present invention have been described based on the data transmission and reception between the relay node and the base station. A specific operation which has been described as being performed by the base station may be performed by an upper node of the base station as the case may be. In other words, it will be apparent that various operations performed for communication with the user equipment in the network which includes a plurality of network nodes along with the base station can be performed by the base station or network nodes other than the base station. The base station may be replaced with terms such as a fixed station, Node B, eNode B (eNB), and access point.

The embodiments according to the present invention may be implemented by various means, for example, hardware, firmware, software, or their combination. If the embodiment according to the present invention is implemented by hardware, the embodiment of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

Although the aforementioned method for reporting channel status information in a wireless communication system and the apparatus therefor have been described based on the 3GPP LTE system, they may be applied to various wireless communication systems in addition to the 3GPP LTE system.

The invention claimed is:

1. A method for transmitting channel status information at a user equipment in a wireless communication system, the method comprising:
   receiving a reference signal from a serving cell or a neighboring cell;
   determining a priority for predetermined precoding matrix indexes (PMIs) based on the reference signal; and
   transmitting, in accordance with the priority, a PMI among the predetermined PMIs to the serving cell together with a stacking flag which indicates initializing a buffer of the serving cell if the priority is changed or storing the PMI in the buffer of the serving cell;
   if the priority is changed, storing the PMI in a buffer of the user equipment; and
   if the priority is unchanged, initializing the buffer of the user equipment,
   wherein a number of PMIs to be transmitted to the serving cell is determined based on a size of the buffer of the serving cell and a size of the buffer of the user equipment, and
   wherein the size of the buffer of the serving cell and the size of the buffer of the user equipment are commonly set in the serving cell and the user equipment.

2. The method according to claim 1, wherein transmitting the PMI to the serving cell includes transmitting repeatedly the PMI in order of a highest priority if PMIs are stored in the buffer of the user equipment as much as the size of the buffer of the user equipment and the priority is not changed.

3. The method according to claim 1, wherein transmitting the PMI to the serving cell includes transmitting repeatedly only the stacking flag, if PMIs are stored in the buffer of the user equipment as much as the size of the buffer of the user equipment and the priority is not changed.

4. The method according to claim 1, further comprising:
calculating a channel quality indicator (CQI) for a channel from the serving cell or the neighboring cell based on PMIs stored in the buffer; and
transmitting the channel quality indicator to the serving cell.

5. The method according to claim 1, wherein the stacking flag has a size of 1 bit.

6. The method according to claim 1, wherein storing the PMI into the buffer or initializing the buffer is requested by toggle of the stacking flag.

7. A user equipment in a wireless communication system, the user equipment comprising:
a reception module configured to receive a reference signal from a serving cell or a neighboring cell;
a processor configured to determine a priority for precoding matrix indexes (PMIs) based on the reference signal; and
a transmission module configured to transmit, in accordance with the priority, a PMI among the predetermined PMIs to the serving cell together with a stacking flag which indicates initializing a buffer of the serving cell if the priority is changed or storing the PMI in the buffer of the serving cell,
wherein the processor configured to store the PMI in a buffer of the user equipment, if the priority is changed, and initialize the buffer of the user equipment, if the priority is unchanged,
wherein a number of PMIs to be transmitted to the serving cell is determined based on a size of the buffer of the serving cell and a size of the buffer of the user equipment, and
wherein the size of the buffer of the serving cell and the size of the buffer of the user equipment are commonly set in the serving cell and the user equipment.

8. The user equipment according to claim 7, wherein the processor controls the transmission module to transmit repeatedly the PMI in order of a highest priority if PMIs are stored in the buffer of the user equipment as much as the size of the buffer of the user equipment and the priority is not changed.

9. The user equipment according to claim 7, wherein the processor controls the transmission module to transmit repeatedly only the stacking flag if PMIs are stored in the buffer of the user equipment as much as the size of the buffer of the user equipment and the priority is not changed.

10. The user equipment according to claim 7, wherein the processor calculates a channel quality indicator (CQI) for a channel from the serving cell or the neighboring cell based on PMIs stored in the buffer, and the transmission module transmits the channel quality indicator to the serving cell.

11. The user equipment according to claim 7, wherein the stacking flag has a size of 1 bit.

12. The user equipment according to claim 11, wherein storing PMIs into the buffer or initializing the buffer is requested by toggle of the stacking flag.

* * * * *